(12) United States Patent
Hoffmeister

(10) Patent No.: US 9,542,939 B1
(45) Date of Patent: Jan. 10, 2017

(54) DURATION RATIO MODELING FOR IMPROVED SPEECH RECOGNITION

(75) Inventor: Bjorn Hoffmeister, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 776 days.

(21) Appl. No.: 13/600,851

(22) Filed: Aug. 31, 2012

(51) Int. Cl.
*G10L 15/26* (2006.01)
*G10L 15/22* (2006.01)

(52) U.S. Cl.
CPC ...................... *G10L 15/22* (2013.01)

(58) Field of Classification Search
CPC ........ G10L 17/14; G10L 15/142; G10L 15/02; G10L 15/063; G10L 15/187
See application file for complete search history.

(56) References Cited

U.S. PATENT DOCUMENTS

| | | | | |
|---|---|---|---|---|
| 5,933,805 A * | 8/1999 | Boss | ................... | G10L 19/0018 704/207 |
| 5,940,797 A * | 8/1999 | Abe | ..................... | G10L 13/10 704/258 |
| 6,101,470 A * | 8/2000 | Eide | ..................... | G10L 13/10 704/260 |
| 2002/0077817 A1* | 6/2002 | Atal | ............................. | 704/254 |
| 2002/0184024 A1* | 12/2002 | Rorex | ..................... | G10L 15/28 704/255 |
| 2004/0073423 A1* | 4/2004 | Freedman | ............... | G10L 15/02 704/235 |
| 2005/0154588 A1* | 7/2005 | Janas, III | ............. | G06F 19/325 704/249 |
| 2005/0243996 A1* | 11/2005 | Fitchmun | ............. | H04M 19/04 379/418 |
| 2007/0033042 A1* | 2/2007 | Marcheret | .............. | G10L 25/78 704/255 |
| 2007/0271241 A1* | 11/2007 | Morris et al. | ...................... | 707/3 |
| 2008/0133241 A1* | 6/2008 | Baker | ................. | G10L 19/0018 704/260 |
| 2010/0004931 A1* | 1/2010 | Ma et al. | ....................... | 704/244 |
| 2010/0174533 A1* | 7/2010 | Pakhomov | ............ | G10L 15/005 704/205 |
| 2010/0250257 A1* | 9/2010 | Hirose | .................. | G10L 13/033 704/278 |
| 2011/0184737 A1* | 7/2011 | Nakano et al. | ............... | 704/254 |
| 2014/0012580 A1* | 1/2014 | Ganong, III | ........ | G10L 15/1815 704/257 |
| 2014/0067391 A1* | 3/2014 | Ganapathiraju et al. | ..... | 704/236 |

OTHER PUBLICATIONS

C.D. Mitchell and L.H. Lamieson, "Modeling duration in a hidden markov model with the exponential family," in ICASSP 1993, Minneapolis (USA), 1993, pp. 331-334.
N. Jennequin and J.L. Gauvain, "Modeling Duration Via Lattice Rescoring," ICASSP 2007, Honolulu, Apr. 2007.

* cited by examiner

*Primary Examiner* — Jakieda Jackson
(74) *Attorney, Agent, or Firm* — Seyfarth Shaw LLP; Ilan N. Barzilay

(57) ABSTRACT

In speech recognition, the duration of a phoneme is taken into account when determining recognition scores. Specifically, the duration of a phoneme may be evaluated relative to the duration of neighboring phonemes. A phoneme that is interpreted to be significantly longer or shorter than its neighbors may be given a lower duration score. A duration score for a phoneme may be calculated and used to adjust a recognition score. In this manner a duration model may supplement an acoustic model and language model to improve speech recognition results.

27 Claims, 15 Drawing Sheets

DURATION RATIO MODELING FOR IMPROVED SPEECH RECOGNITION

BACKGROUND

Human-computer interactions have progressed to the point where humans can control computing devices, and provide input to those devices, by speaking. Computing devices employ techniques to identify the words spoken by a human user based on the various qualities of a received audio input. Such techniques are called speech recognition or automatic speech recognition (ASR). Speech recognition combined with language processing techniques may allow a user to control a computing device to perform tasks based on the user's spoken commands. Speech recognition may also convert a user's speech into text data which may then be provided to various textual based programs and applications.

Speech recognition may be used by computers, hand-held devices, telephone computer systems, kiosks and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Aspects of the present disclosure include a method and system to perform speech recognition on individual identifiable sounds (called phones or phonemes) by comparing an individual phoneme's duration to the duration of a group of phonemes neighboring the individual phoneme. Based on this comparison, the probability that a portion of processed audio data matches a phoneme may be adjusted.

Traditional speech recognition techniques often have difficulty correctly processing phonemes having unusually long or unusually short durations. A speaker will not typically drag out a sound in a word much longer than its neighbors, for example by saying "heeeeeeeello" instead of "hello". Similarly, a speaker will not typically cut short a sound in a word. Therefore, when audio data is interpreted to include such extended or contracted phonemes, they should often be discarded as noise or errors. However, automated speech recognition (ASR) systems that use traditional speech recognition techniques may incorrectly interpret audio data to have unusually long or unusually short duration phonemes and as a result generate speech recognition errors.

To correct for this problem, aspects of the present disclosure include a duration model of speech recognition. According to the disclosed duration model, if a specific phoneme has a duration that significantly varies from an expected duration, as compared to the duration of its neighbors, then the probability that the specific phoneme matches a speech phoneme may be decreased. By considering the duration of individual phonemes in this manner rather than ignoring the duration of a phoneme or considering the duration of a phoneme out of context, we can decrease speech recognition errors. This avoids context independent duration modeling, for example penalizing longer phonemes without considering whether such longer phonemes are normal (such as when a user is speaking slowly). Accounting for relative phoneme duration in this manner may allow an ASR system to more accurately process phonemes of different durations.

Although the description above uses phonemes as example speech units, other speech units may be used. Examples of such speech units include a syllable, part of a syllable, word, etc. The speech unit may also include a phoneme in context such as a triphone (a phoneme in the context of two other phonemes), quinphone (a phoneme in the context of four other phonemes), etc. Although phoneme is used in the description of the present disclosure for purposes of clarity of illustration, the duration modeling as described in the present disclosure may apply using a variety of different speech units.

Figure 1A:
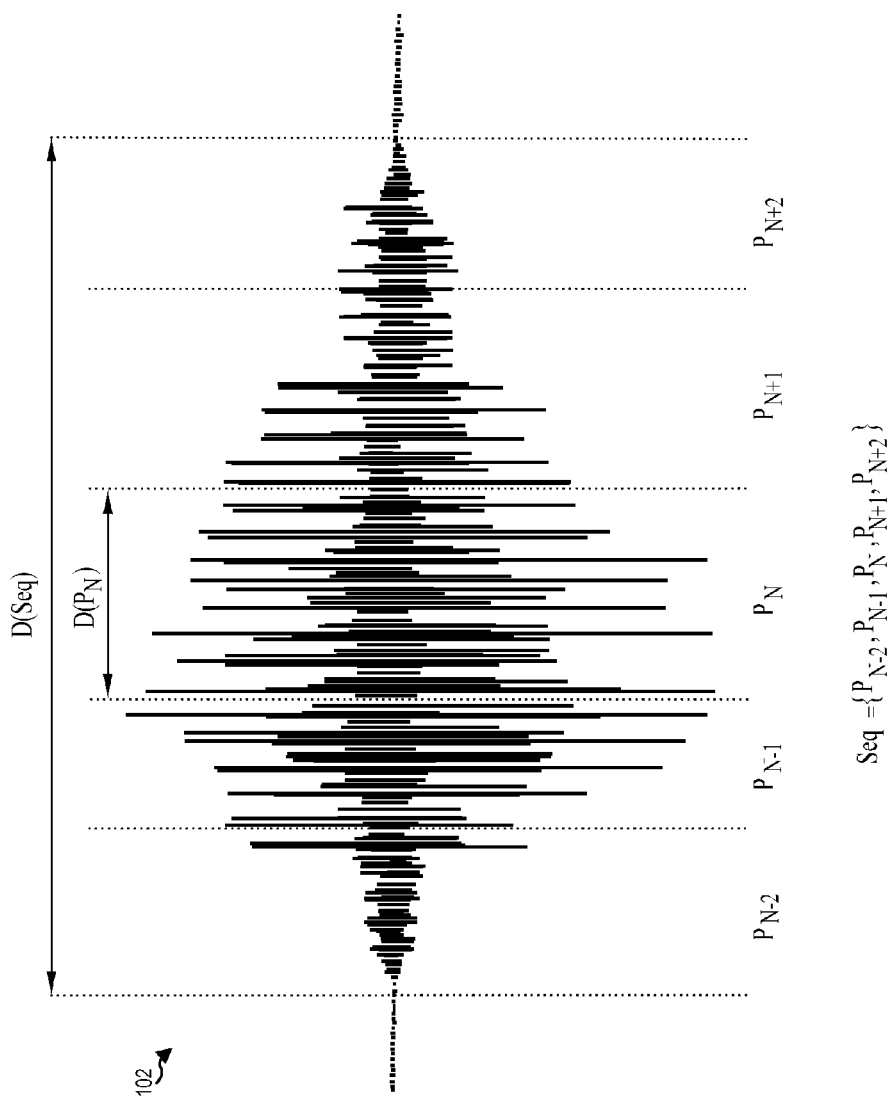
FIG. 1A illustrates an audio waveform processed according to one aspect of the present disclosure.

FIG. 1A shows an example of an audio waveform representing a spoken utterance such as one word 102. The word 102 includes multiple phonemes $P_{N-2}$ through $P_{N+2}$. When analyzing a particular phoneme called $P_N$, an ASR system may consider its duration $D(P_N)$ as well as the duration $D(Seq)$ of a sequence of phonemes $Seq=\{P_{N-2}, P_{N-1}, P_N, P_{N+1}, P_{N+2}\}$, which includes $P_N$ as well as its neighbors, the two phonemes preceding $P_N$, phonemes $P_{N-2}$ and $P_{N-1}$, and the two phonemes following $P_N$, phonemes $P_{N+1}$ and $P_{N+2}$. Based on the information provided in a duration training corpus (described below), the ASR system may then calculate the probability that phoneme $P_N$ matches a speech phoneme based on the duration of the phoneme $D(P_N)$ and the duration of the sequence $D(Seq)$.

Figure 1B:
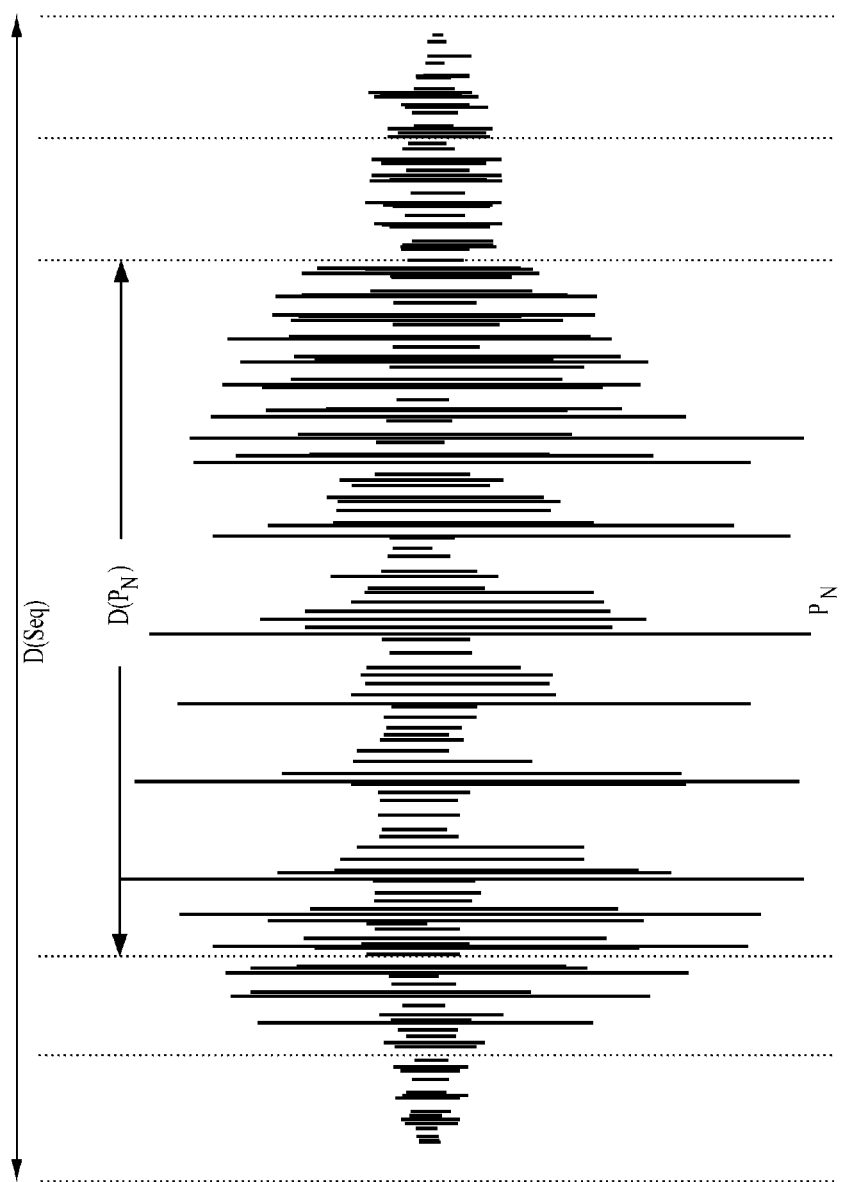
FIG. 1B illustrates an audio waveform processed according to one aspect of the present disclosure.

An example of a phoneme that may be rescored with a lower probability is shown in FIG. 1B. As shown in FIG. 1B, the duration $D(P_N)$ of the phoneme $P_N$ is longer than the duration of its neighboring phonemes and constitutes an out-of-proportion segment of the duration $D(Seq)$ of the sequence group. In the example of FIG. 1B, application of the duration model to phoneme $P_N$ in the group may result in a downward rescoring of $P_N$, meaning the probability that $P_N$ matches the corresponding phoneme would be reduced.

Figure 2:
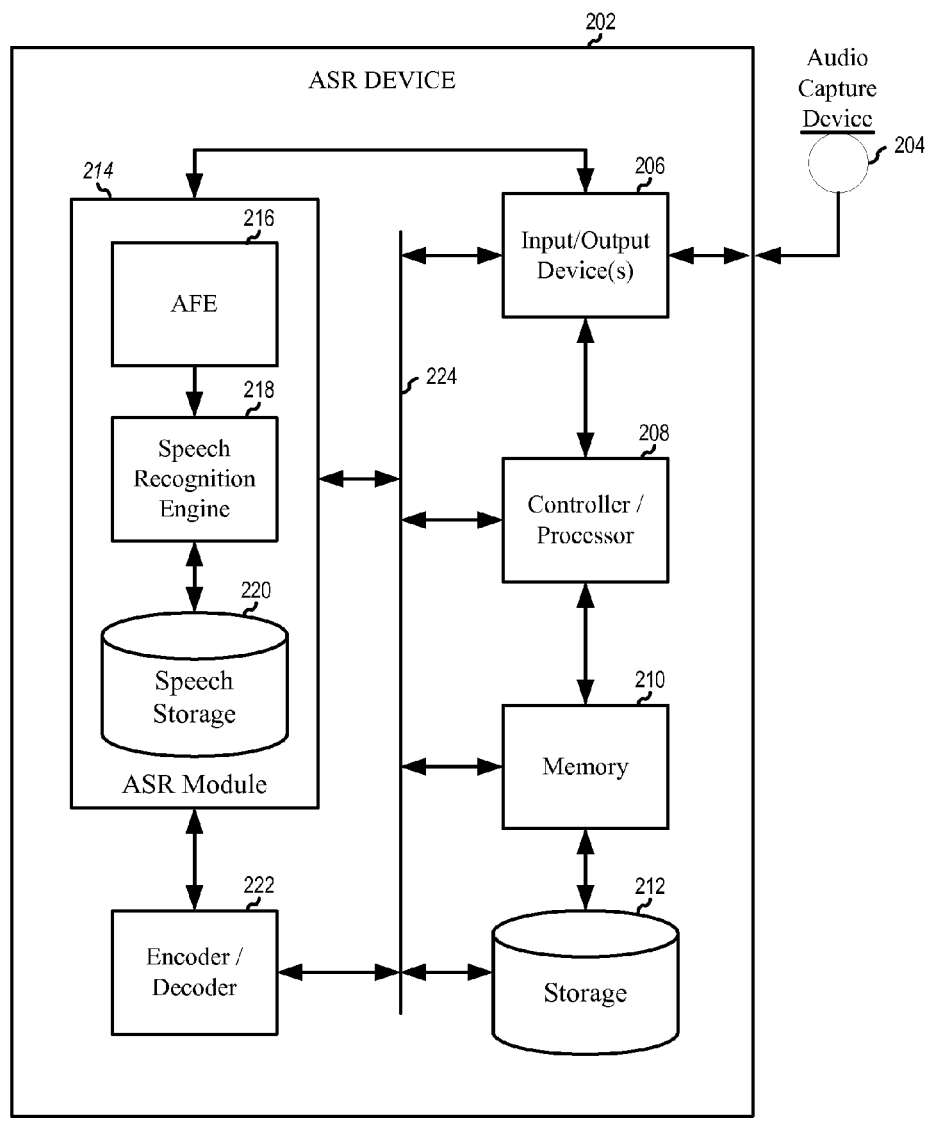
FIG. 2 is a block diagram conceptually illustrating a device for speech recognition according to one aspect of the present disclosure.

FIG. 2 shows an automatic speech recognition (ASR) device 202 for performing speech recognition. Aspects of the present disclosure include computer-readable and computer-executable instructions that may reside on the ASR device 202. FIG. 2 illustrates a number of components that may be included in the ASR device 202, however other non-illustrated components may also be included. Also, some of the illustrated components may not be present in every device capable of employing aspects of the present disclosure. Further, some components that are illustrated in the ASR device 202 as a single component may also appear multiple times in a single device. For example, the ASR device 202 may include multiple input/output devices 206 or multiple controllers/processors 208.

Multiple ASR devices may be employed in a single speech recognition system. In such a multi-device system, the ASR devices may include different components for performing different aspects of the speech recognition process. The multiple devices may include overlapping components. The ASR device as illustrated in FIG. 2 is exemplary, and may be a stand-alone device or may be included, in whole or in part, as a component of a larger device or system.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The ASR device 202 may also be a component of other devices or systems that may provide speech recognition functionality such as automated teller machines (ATMs), kiosks, home appliances (such as refrigerators, ovens, etc.), vehicles (such as cars, busses, motorcycles, etc.) and/or exercise equipment, for example.

As illustrated in FIG. 2, the ASR device 202 may include an audio capture device 204 for capturing spoken utterances for processing. The audio capture device 204 may include a microphone or other suitable component for capturing sound. The audio capture device 204 may be integrated into the ASR device 202 or may be separate from the ASR device 202. The ASR device 202 may also include an address/data bus 224 for conveying data among components of the ASR device 202. Each component within the ASR device 202 may also be directly connected to other components in addition to (or instead of) being connected to other components across the bus 224. Although certain components are illustrated in FIG. 2 as directly connected, these connections are illustrative only and other components may be directly connected to each other (such as the ASR module 214 to the controller/processor 208).

The ASR device 202 may include a controller/processor 208 that may be a central processing unit (CPU) for processing data and computer-readable instructions and a memory 210 for storing data and instructions. The memory 210 may include volatile random access memory (RAM), non-volatile read only memory (ROM) and/or other types of memory. The ASR device 202 may also include a data storage component 212, for storing data and instructions. The data storage component 212 may include one or more storage types such as magnetic storage, optical storage, solid-state storage, etc. The ASR device 202 may also be connected to removable or external memory and/or storage (such as a removable memory card, memory key drive, networked storage, etc.) through the input/output device 206. Computer instructions for processing by the controller/processor 208 for operating the ASR device 202 and its various components may be executed by the controller/processor 208 and stored in the memory 210, storage 212, external device, or in memory/storage included in the ASR module 214 discussed below. Alternatively, some or all of the executable instructions may be embedded in hardware or firmware in addition to or instead of software. The teachings of this disclosure may be implemented in various combinations of software, firmware and/or hardware, for example.

The ASR device 202 includes input/output device(s) 206. A variety of input/output device(s) may be included in the device. Example input devices include an audio capture device 204, such as a microphone (pictured as a separate component), a touch input device, keyboard, mouse, stylus or other input device. Example output devices include a visual display, tactile display, audio speakers, headphones, printer or other output device. The input/output device 206 may also include an interface for an external peripheral device connection such as universal serial bus (USB), FireWire, Thunderbolt or other connection protocol. The input/output device 206 may also include a network connection such as an Ethernet port, modem, etc. The input/output device 206 may also include a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, etc. Through the input/output device 206 the ASR device 202 may connect to a network, such as the Internet or private network, which may include a distributed computing environment.

The device may also include an ASR module 214 for processing spoken audio data into text. The ASR module 214 translates audio data into text data representing the words of the speech contained in the audio data. The text data may then be used by other components for various purposes, such as executing system commands, inputting data, etc. Audio data including spoken utterances may be processed in real time or may be saved and processed at a later time. A spoken utterance in the audio data is input to the ASR module 214 which then interprets the utterance based on the similarity between the utterance and models known to the ASR module 214. For example, the ASR module 214 may compare the input audio data with models for sounds (e.g., speech units or phonemes) and sequences of sounds to identify words that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model) and the likelihood that a particular word which matches the sounds would be included in the sentence at the specific location (e.g., using a language or grammar model). Based on the considered factors and the assigned recognition score, the ASR module 214 may output the most likely words recognized in the audio data. The ASR module 214 may also output multiple alternative recognized words in the form of a lattice or an N-best list (described in more detail below).

While a recognition score may represent a probability that a portion of audio data corresponds to a particular phoneme or word, the recognition score may also incorporate other information which indicates the ASR processing quality of the scored audio data relative to the ASR processing of other audio data. A recognition score may be represented as a number on a scale from 1 to 100, as a probability from 0 to 1, a log probability or other indicator. A recognition score may indicate a relative confidence that a section of audio data corresponds to a particular phoneme, word, etc.

The ASR module 214 may be connected to the bus 224, input/output device(s) 206, audio capture device 204, encoder/decoder 222, controller/processor 208 and/or other component of the ASR device 202. Audio data sent to the ASR module 214 may come from the audio capture device 204 or may be received by the input/output device 206, such as audio data captured by a remote entity and sent to the ASR device 202 over a network. Audio data may be in the form of a digitized representation of an audio waveform of spoken utterances. The sampling rate, filtering and other aspects of the analog-to-digital conversion process may impact the overall quality of the audio data. Various settings of the audio capture device 204 and input/output device 206 may be configured to adjust the audio data based on traditional tradeoffs of quality versus data size or other considerations.

The ASR module 214 includes an acoustic front end (AFE) 216, a speech recognition engine 218 and speech storage 220. The AFE 216 transforms audio data into data for processing by the speech recognition engine 218. The speech recognition engine 218 compares the speech recognition data with the acoustic, language and other data models and information stored in the speech storage 220 for recognizing the speech contained in the original audio data. The AFE 216 and speech recognition engine 218 may include their own controller(s)/processor(s) and memory or they may use the controller/processor 208 and memory 210 of the ASR device 202, for example. Similarly, the instructions for operating the AFE 216 and speech recognition engine 218 may be located within the ASR module 214, within the memory 210 and/or storage 212 of the ASR device 202, or within an external device.

Figure 3:
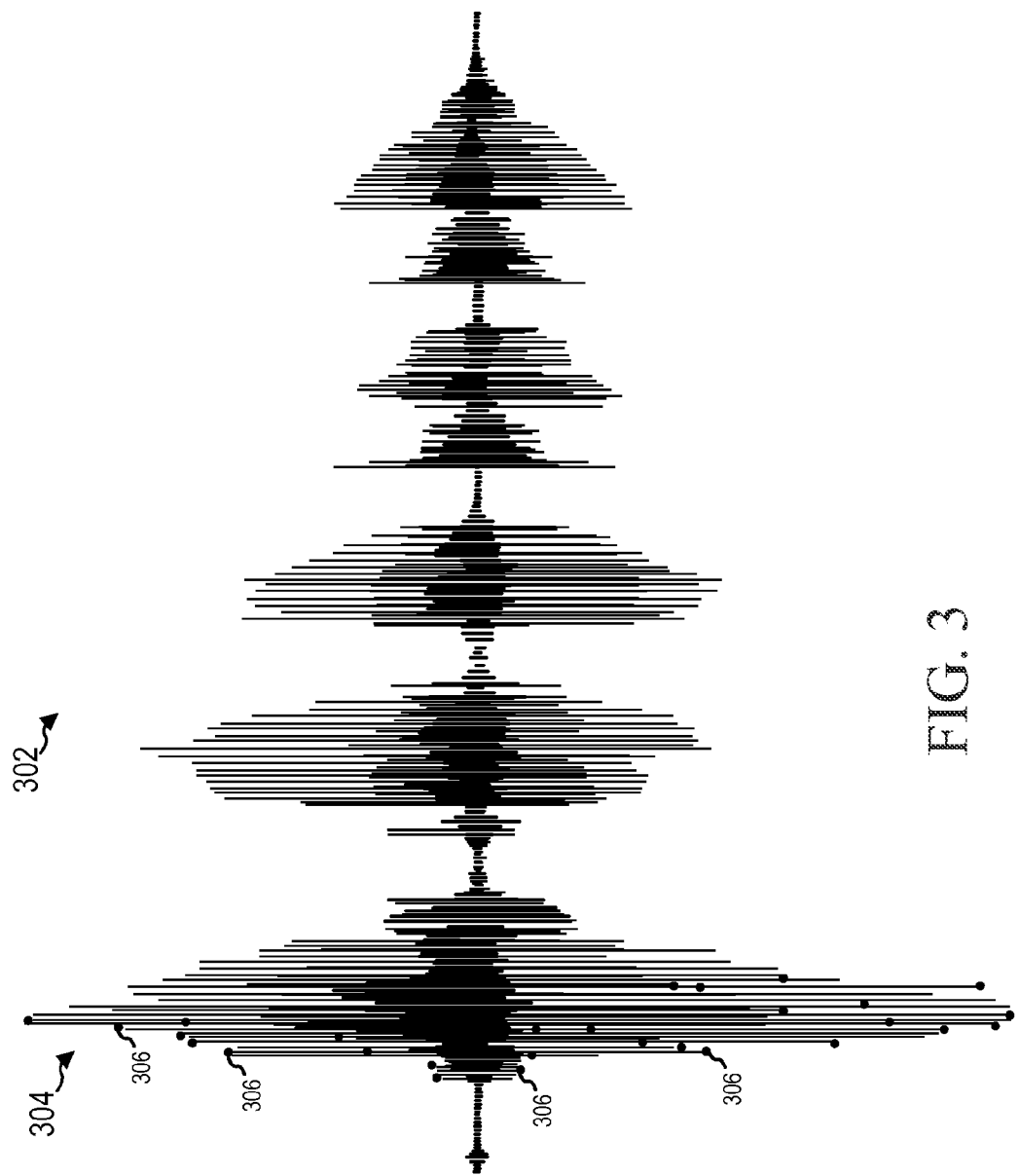
FIG. 3 illustrates an audio waveform processed according to one aspect of the present disclosure.

Received audio data may be sent to the AFE 216 for processing. The AFE 216 may reduce noise in the audio data, identify parts of the audio data containing speech for processing, and segment and process the identified speech components. The AFE 216 may divide the digitized audio data into frames, with each frame representing a time interval, for example 10 milliseconds (ms). During that frame the AFE 216 determines a set of values, called a feature vector, representing the features/qualities of the utterance portion within the frame. Feature vectors may contain a varying number of values, for example forty. The feature vector may represent different qualities of the audio data within the frame. FIG. 3 shows a digitized audio data waveform 302, with multiple points 306 of the first word 304 as the first word 304 is being processed. The audio qualities of those points may be stored into feature vectors. Feature vectors may be combined into a matrix that represents a time period of the spoken utterance. These feature vector matrices may then be passed to the speech recognition engine 218 for processing.

Processed feature vectors may be output from the ASR module 214 and sent to the input/output device 206 for transmission to another device for further processing. The feature vectors may be encoded and/or compressed by the encoder/decoder 222 prior to transmission. The encoder/decoder 222 may be customized for encoding and decoding ASR data, such as digitized audio data, feature vectors, etc. The encoder/decoder 222 may also encode non-ASR data of the ASR device 202, for example using a general encoding scheme such as .zip, etc. The functionality of the encoder/decoder 222 may be located in a separate component, as illustrated in FIG. 2, or may be executed by the controller/processor 208, ASR module 214, or other component, for example.

The speech recognition engine 218 may process the output from the AFE 216 with reference to information stored in the speech storage 220. Alternatively, post front-end processed data (such as feature vectors) may be received by the ASR module 214 from another source besides the internal AFE 216. For example, another entity may process audio data into feature vectors and transmit that information to the ASR device 202 through the input/output device(s) 206. Feature vectors may arrive at the ASR device 202 encoded, in which case they may be decoded (for example by the encoder/decoder 222) prior to processing by the speech recognition engine 218.

The speech storage 220 includes a variety of information for speech recognition such as data matching pronunciations of phonemes to particular words. This data may be referred to as an acoustic model. The speech storage may also include a dictionary of words or a lexicon. The speech storage may also include data describing words that are likely to be used together in particular contexts. This data may be referred to as a language or grammar model. The speech storage 220 may also include a training corpus that may include recorded speech and/or corresponding transcription, that may be used to train the models used by the ASR module 214 in speech recognition. The training corpus may be used train the speech recognition models, including the acoustic models and language models, in advance. The models may then be used during ASR processing.

The training corpus may include a number of sample utterances with associated feature vectors and associated correct text that may be used to create, for example, acoustic models and language models. The sample utterances may be used to create mathematical models corresponding to expected audio for particular speech units. Those speech units may include a phoneme, syllable, part of a syllable, word, etc. The speech unit may also include a phoneme in context such as a triphone, quinphone, etc. Phonemes in context used regularly in speech may be associated with their own individual recognition scores. Phonemes in context that are less common may be clustered together to have a group recognition score. By clustering phoneme groups in this manner, fewer models may be included in the training corpus, thus easing ASR processing. The training corpus may include multiple versions of the same utterance from different speakers to provide different utterance comparisons for the ASR module 214. The training corpus may also include correctly recognized utterances as well as incorrectly recognized utterances. These incorrectly recognized utterances may include grammar errors, false recognition errors, noise, or other errors that provide the ASR module 214 with examples of error types and corresponding corrections, for example.

Other information may also be stored in the speech storage 220 for use in speech recognition. The contents of the speech storage 220 may be prepared for general ASR use or may be customized to include sounds and words that are likely to be used in a particular application. For example, for ASR processing at an ATM, the speech storage 220 may include customized data specific to banking transactions. In certain instances the speech storage 220 may be customized for an individual user based on his/her individualized speech input. To improve performance, the ASR module 214 may revise/update the contents of the speech storage 220 based on feedback of the results of ASR processing, thus enabling the ASR module 214 to improve speech recognition beyond the capabilities provided in the training corpus.

The speech recognition engine 218 attempts to match received feature vectors to language phonemes and words as known in the speech storage 220. The speech recognition engine 218 computes recognition scores for the feature vectors based on acoustic information and language information. The acoustic information is used to calculate an acoustic score representing a likelihood that the intended sound represented by a group of feature vectors match a language phoneme. The language information is used to adjust the acoustic score by considering what sounds and/or words are used in context with each other, thereby improving the likelihood that the ASR module outputs speech results that make sense grammatically.

The speech recognition engine 218 may use a number of techniques to match feature vectors to phonemes. One common technique is using Hidden Markov Models (HMMs). HMMs are used to determine probabilities that feature vectors may match phonemes. Using HMMs, a number of states are presented, in which the states together represent a potential phoneme and each state is associated with a model, such as a Gaussian mixture model. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle and end of a spoken language sound). An initial determination of a probability of a potential phoneme may be associated with one state. As new feature vectors are processed by the speech recognition engine 218, the state may change or stay the same, based on the processing of the new feature vectors. A Viterbi algorithm may be used to find the most likely sequence of states based on the processed feature vectors.

Figure 4:
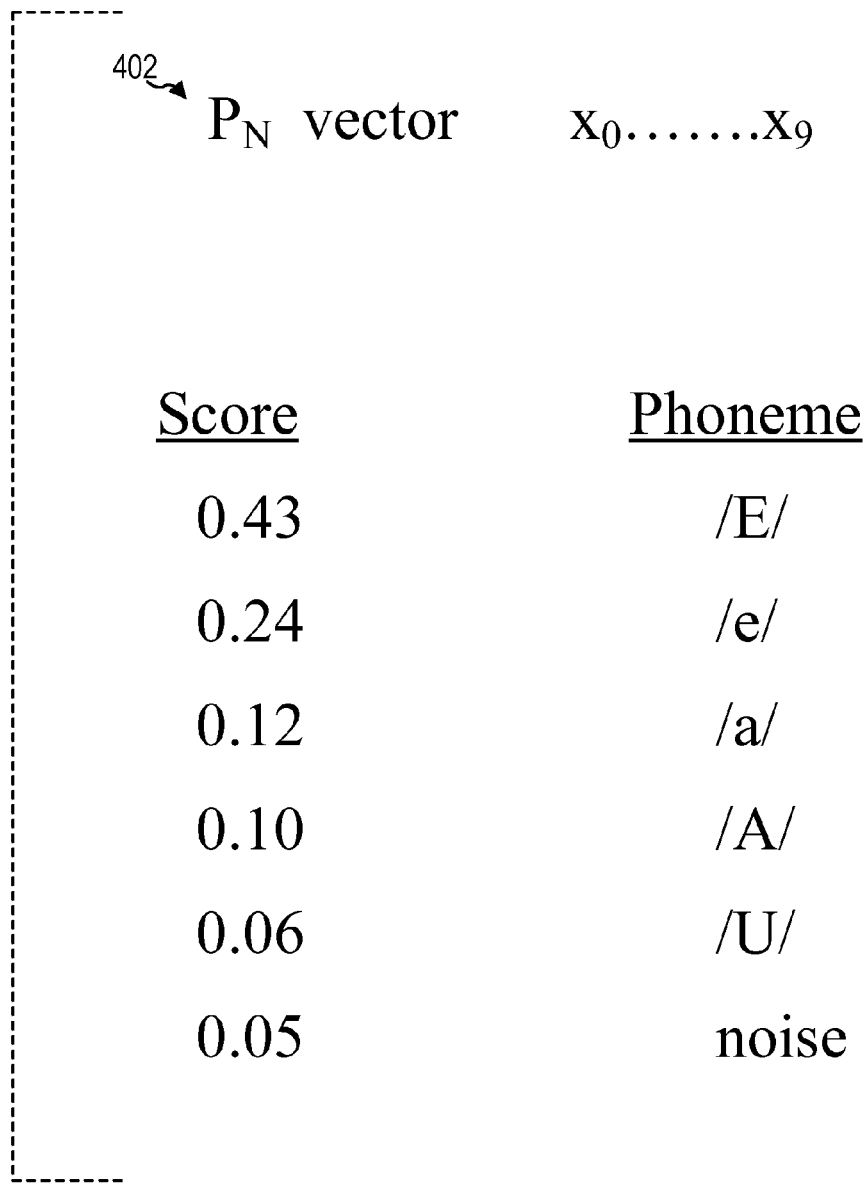
FIG. 4 illustrates phoneme processing according to one aspect of the present disclosure.

In one example, the speech recognition engine 218 may receive a series of feature vectors for sound corresponding to a user saying "Hello, how are you today?" The speech recognition engine 218 may attempt to match each feature vector with a phoneme in the speech recognition database 220. For example, FIG. 4 shows a series of feature vectors 402 corresponding to phoneme $P_N$ (representing the "e" sound in "hello"), including ten feature vectors $X_0$ through $X_9$. Upon processing of the first feature vector, the speech recognition engine 218 makes a preliminary determination as to the probability that the feature vector matches a phoneme, shown as the score in FIG. 4. Based on the feature vector, the phoneme /E/ may be assigned an initial recognition score of 0.43 (representing a 43% probability that the matrix represents phoneme /E/), phoneme /e/ (a different pronunciation from /E/) may be assigned a recognition score of 0.24, etc. The recognition score may be based on how closely the feature vector matches a distribution associated with a phoneme within one or more acoustic models stored in the speech storage 220. A feature vector may also be assigned a probability that the feature vector represents noise or silence. In the example of FIG. 4, the probability that the feature vector represents noise is 0.05.

Figure 5:
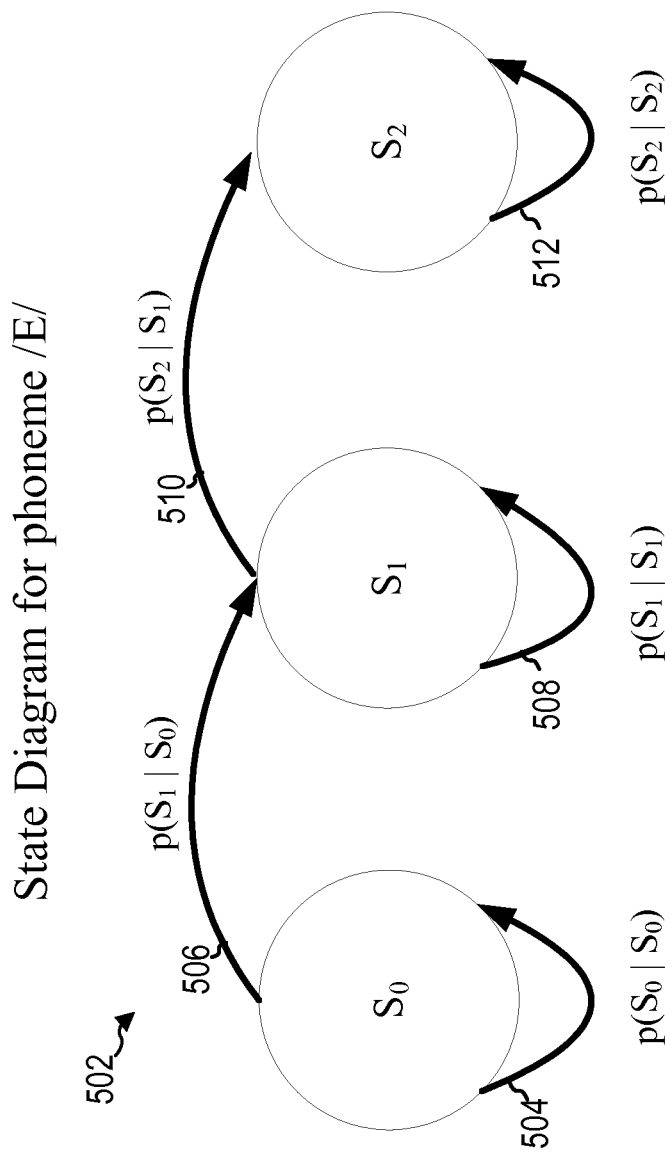
FIG. 5 illustrates phoneme processing in a Hidden Markov Model according to one aspect of the present disclosure.

Taking the example of the feature vector with a recognition score of 0.43 for the phoneme /E/ shown in FIG. 4, the speech recognition engine 218 initially assigns a recognition score of 0.43 that the feature vector matches the first state of the phoneme /E/, shown as state $S_0$ in the Hidden Markov Model illustrated in FIG. 5. After further processing, the speech recognition engine 218 determines whether the state should either remain the same, or change to a new state. For example, whether the state should remain the same 504 may depend on the corresponding transition probability (written as $P(S_0|S_0)$, meaning the probability of going from state $S_0$ to $S_0$) and how well the subsequent frame matches states $S_0$ and $S_1$. If state $S_1$ is the most probable, the calculations move to state $S_1$ and continue from there. For subsequent frames, the speech recognition engine 218 similarly determines whether the state should remain at $S_1$, using the transition probability represented by $P(S_1|S_1)$ 508, or move to the next state, using the transition probability $P(S_2|S_1)$ 510. As the processing continues, the speech recognition engine 218 continues calculating such probabilities including the probability 512 of remaining in state $S_2$ or the probability of moving from a state of illustrated phoneme /E/ to a state of another phoneme. After processing the feature vectors for state $S_2$, the speech recognition may move to the next phoneme in the utterance.

The probabilities and states may be calculated using a number of techniques. For example, probabilities for each state may be calculated using a Gaussian model, Gaussian mixture model, or other technique based on the feature vectors and the contents of the speech storage 220. Techniques such as maximum likelihood estimation (MLE) may be used to estimate the probability of phoneme states.

In addition to calculating potential states for one phoneme as a potential match to a feature vector, the speech recognition engine 218 may also calculate potential states for other phonemes, such as phoneme /e/ and/or phoneme /a/ for the example shown in FIG. 4 as potential matches for the feature vector. In this manner multiple states and state transition probabilities may be calculated.

The probable states and probable state transitions calculated by the speech recognition engine 218 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 218 may also compute path scores of branches of the paths, based on language models or grammars. Language modeling involves determining scores for what words are likely to be used together to form coherent words and sentences. Application of a language model may improve the likelihood that the ASR module 214 correctly interprets the speech contained in the audio data. For example, acoustic model processing returning the potential phoneme paths of "H E L O", "H A L O" and "Y E L O" may be adjusted by a language model to adjust the recognition scores of "H E L O" (interpreted as the word "hello"), "H A L O" (interpreted as the word "halo") and "Y E L O" (interpreted as the word "yellow") based on the language context of each word within the spoken utterance. The language model may be determined using a training corpus stored in the speech storage 220 and may be customized for particular applications.

Figure 6:
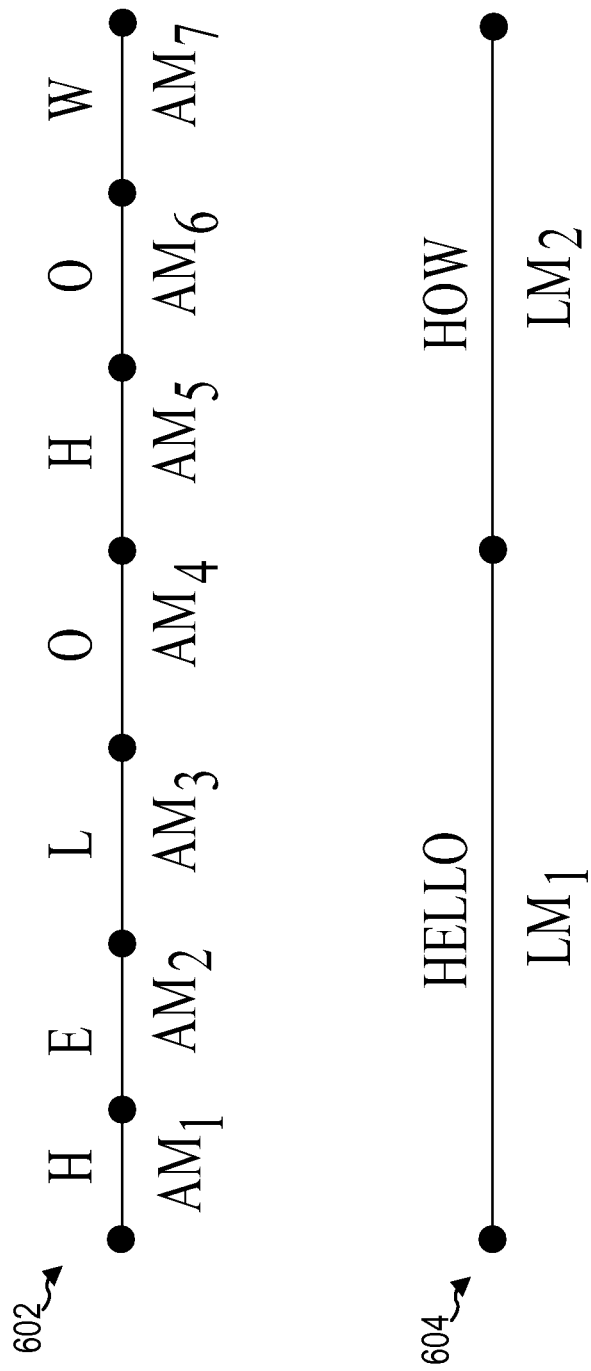
FIG. 6 illustrates phoneme processing and word processing according to one aspect of the present disclosure.

FIG. 6 illustrates the relationship between acoustic modeling and language modeling. As illustrated, each processed phoneme included in the path 602 is associated with an acoustic model score AM1 through AM7. The language model is then applied to associate each word in the path 604 with a language model score LM1 or LM2.

As part of the language modeling (or in other phases of the ASR processing) the speech recognition engine 218 may, to save computational resources, prune and discard low recognition score states or paths that have little likelihood of corresponding to the spoken utterance, either due to a low recognition score pursuant to the language model, or for other reasons. Further, during the ASR processing the speech recognition engine 218 may iteratively perform additional processing passes on previously processed utterance portions. Later passes may incorporate results of earlier passes to refine and improve results.

Figure 7:
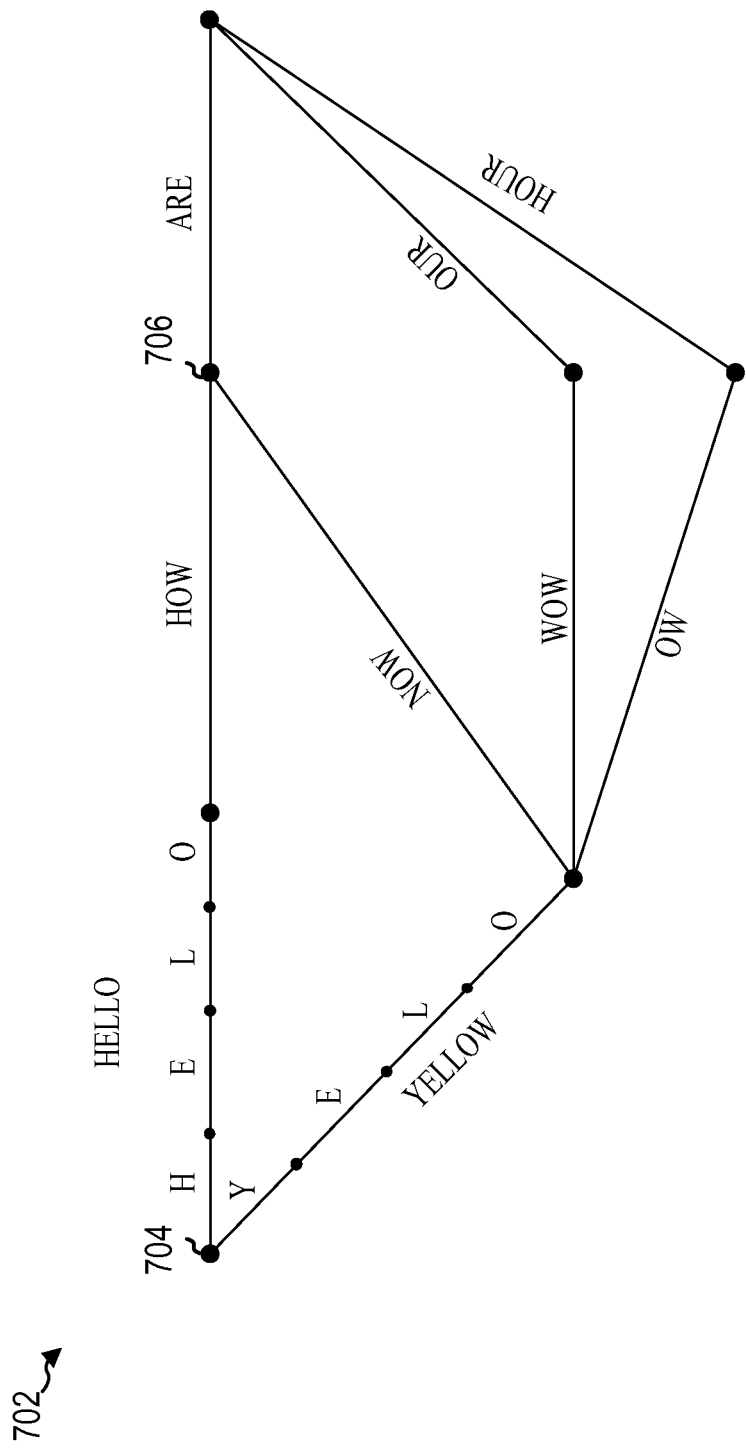
FIG. 7 illustrates a speech recognition lattice according to one aspect of the present disclosure.

The speech recognition engine 218 may combine potential paths into a lattice representing speech recognition results. A sample lattice is shown in FIG. 7. The lattice 702 shows multiple potential paths of speech recognition results. Paths between large nodes represent potential words (for example "hello", "yellow", etc.) and paths between smaller nodes represent potential phonemes (for example "H", "E", "L", "O" and "Y", "E", "L", "O"). For purposes of illustration, individual phonemes are only shown for the first two words of the lattice. The two paths between node 704 and node 706 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score and/or other factors, may be returned by the speech recognition engine 218 as the ASR result for the associated feature vectors.

Figure 8:
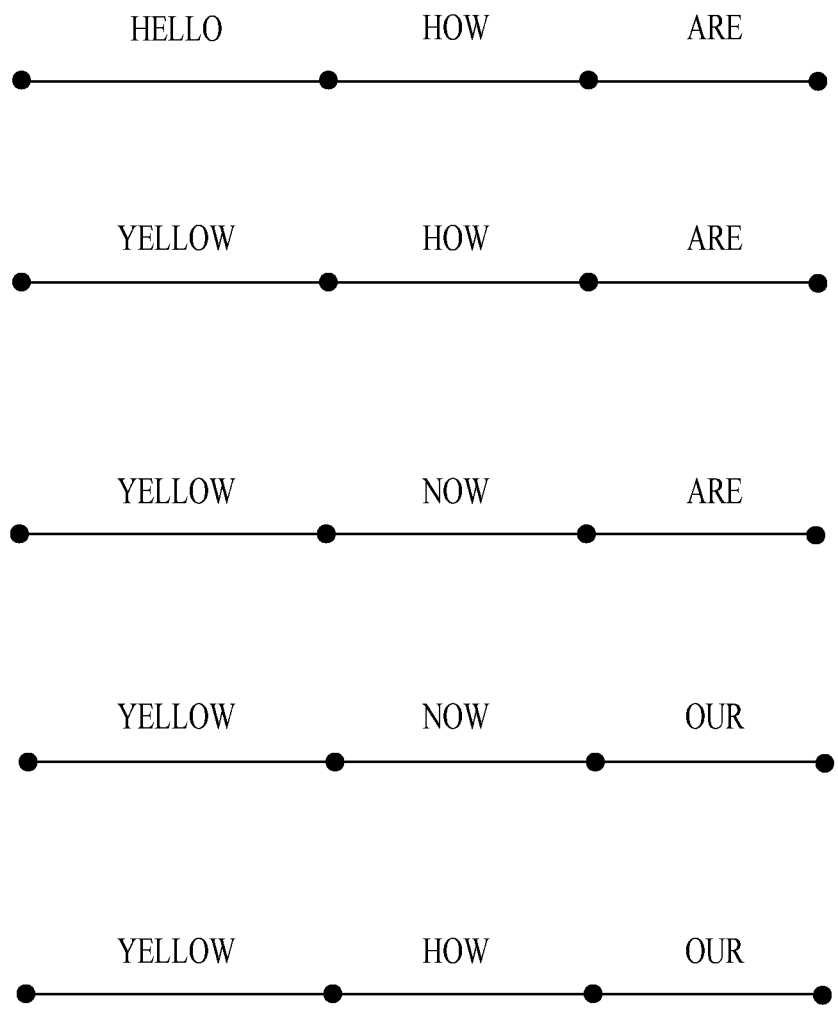
FIG. 8 illustrates an N-best list according to one aspect of the present disclosure.

The speech recognition engine 218 may return an N-best list of paths along with their respective recognition scores, corresponding to the top N paths as determined by the speech recognition engine 218. For example, FIG. 8 shows an N-best list returned for processing of a three-word path. An application (such as a program or component either internal or external to the ASR device 202) that receives the N-best list may then perform further operations or analysis on the list given the list and the associated recognition scores. For example, the N-best list may be used in correcting errors and training various options and processing conditions of the ASR module 214. The speech processing engine 218 may compare the actual correct utterance with the best result and with other results on the N-best list to determine why incorrect recognitions received certain recognition scores. The speech processing engine 218 may correct its approach (and may update information in the speech storage 220) to reduce the recognition scores of incorrect approaches in future processing attempts.

Following ASR processing, the ASR results may be sent by the ASR module 214 to another component of the ASR device 202, such as the controller/processor 208 for further processing (such as execution of a command included in the interpreted text) or to the input/output device 206 for sending to an external device.

ASR systems may sometimes recognize audio data as speech even when the particular audio data is noise or does not include speech. A number of techniques may be employed to limit false detection of speech. One particular situation that may lead to false detection occurs when a sound includes qualities otherwise expected of speech (such as normal volume, frequency, etc.), an ASR system without an effective mechanism to adjust processing based on the duration of individual phonemes may mistakenly process the sound as speech.

Aspects of the present disclosure provide a method and system to account for the duration of individual phonemes in ASR processing. The present disclosure offers duration modeling, in which the duration of an individual phoneme is considered in the ASR processing, relative to the duration of neighboring phonemes.

Referring again to FIG. 1A, the duration D(PN) of a speech unit, such as phoneme PN, will be considered in the ASR processing, relative to the duration of a sequence of speech units, such as sequence Seq {PN−2, PN−1, PN, PN+1, PN+2}, which includes PN as well as its neighbors. The duration of a speech unit compared to the duration of a sequence of speech units may be referred to as a duration ratio. Although various examples are described with sequences of five consecutive phonemes, it should be understood that sequences having more or fewer than five phonemes may also be used according to the present disclosure. Duration modeling may be performed on various speech units, which may include a phoneme, syllable, part of a syllable, word, etc. The speech units may also include phonemes in context such as a triphone, quinphone, etc. The duration of the speech units is considered in relation to the duration of neighboring speech units. For purposes of this disclosure, duration modeling is illustrated with phoneme length speech units.

Figure 9:
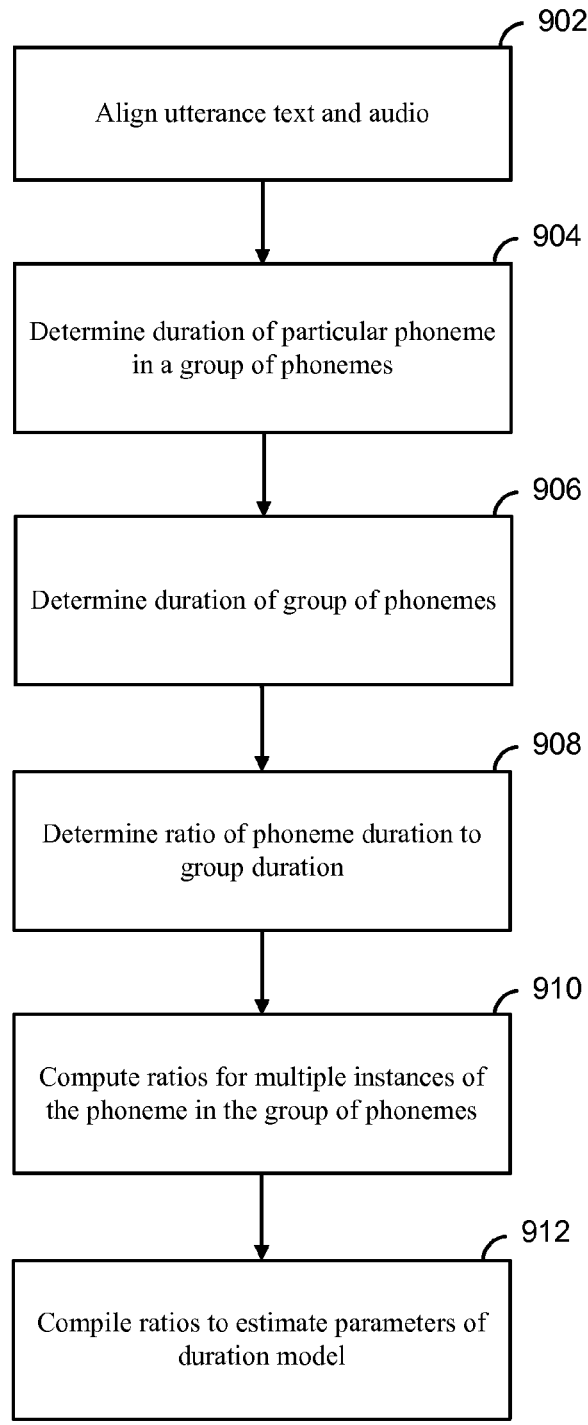
FIG. 9 illustrates creation of a duration training corpus according to one aspect of the present disclosure.

In order to perform duration modeling, the training corpus may include a duration training corpus. The duration training corpus may be based on information already included in the training corpus or may be based on new information added to the training corpus. To create a duration corpus, in some embodiments, a set of known utterances with their associated audio data and text are processed as illustrated in FIG. 9. First, the text and audio of available utterances are aligned so that a specific portion of audio data may be matched to its corresponding text, as shown in block 902. Alignment may be performed by aligning individual feature vectors to states of an HMM using techniques such as a Viterbi algorithm. Once aligned, the duration of individual phonemes of the text may be measured in the audio data. The duration of a particular phoneme in a group of phonemes is determined, as shown in block 904. For example, the duration of the phoneme "E" in the group "HEL" may be determined. Next, the duration of the group of phonemes containing the particular phoneme is determined, as shown in block 906. For example, the duration of the group of phonemes "HEL" may be determined. The group of phonemes may or may not include the particular phoneme from block 904. In some embodiments, the group may consist of a single phoneme, such as a phoneme adjacent to the phoneme of block 904. A comparison of the phoneme duration to the group duration is then calculated, as shown in block 908. In some embodiments, the comparison may be a ratio of the two durations. This comparison may then computed for multiple instances of the phoneme appearing in the group of phonemes. For example, for multiple instances of "E" appearing in "HEL", the comparison of the duration of "E" to the duration of "HEL" is calculated.

The number of considered instances may include all or a subset of the instances in the training corpus of the phoneme in the particular group of phonemes. For popular phoneme groupings, many instances may be available for processing. For infrequently used phoneme groupings, fewer instances may be available. The greater number of instances evaluated, the better data the duration training corpus will have for performing duration modeling. A large duration training corpus, however, may take up significant computing resources in terms of both storage/memory in the speech storage 220 and in time spent processing the duration modeling by the speech recognition engine 218.

Figure 10:
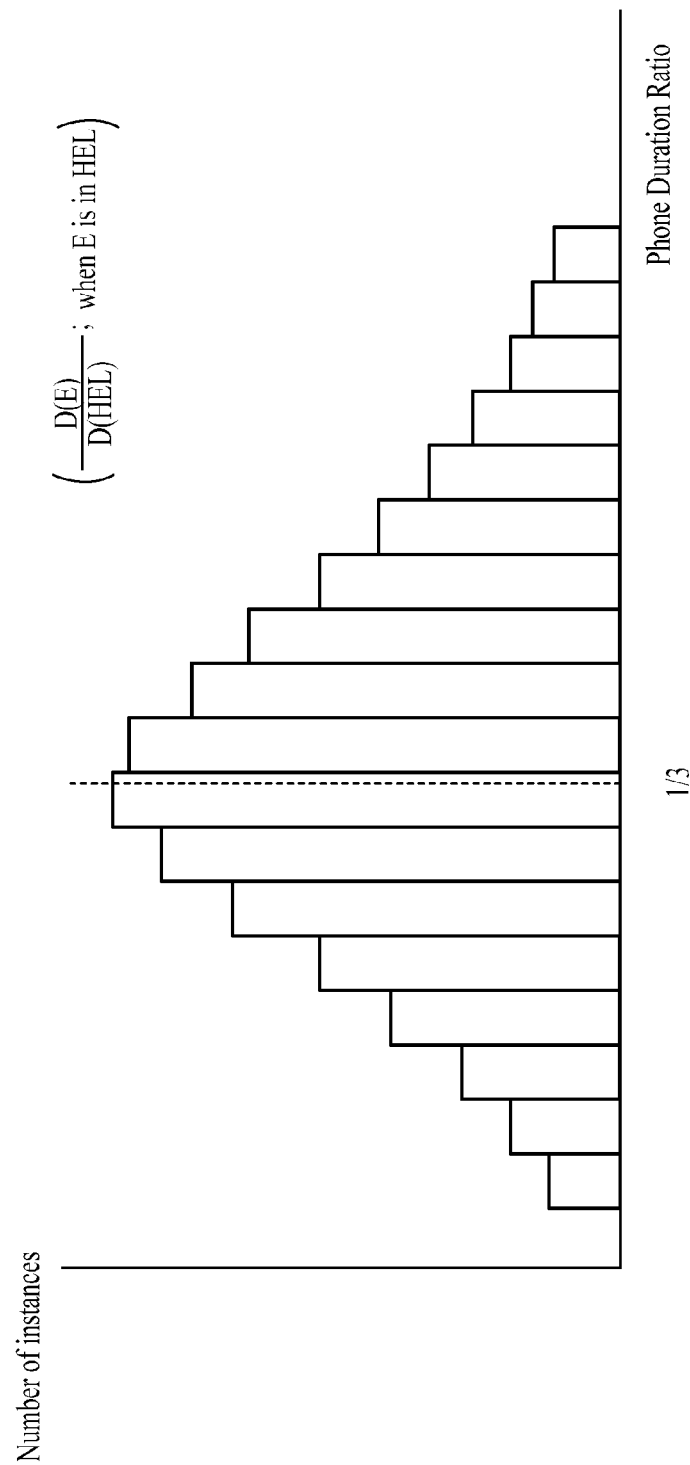
FIG. 10 illustrates a histogram of computed duration probabilities according to one aspect of the present disclosure.

For clarity, the following examples will use a ratio as the comparison of the durations, but any relevant comparison known to one of skill in the art may be used. Once the ratios are calculated for the multiple instances of the phoneme in the group of phonemes, these values may be compiled and a histogram of the relative ratios may be obtained as shown in block 910. For purposes of illustration, FIG. 10 shows a possible histogram of the ratio of the duration of a phoneme (E) within a group of phonemes (HEL) for multiple instances of the phoneme/group of phonemes combination. Plotting the histogram as shown in FIG. 10 is not needed, but is illustrated here to explain one method of determining a distribution of durations.

Once durations are determined from training data as described above they may be used to estimate the parameters of a duration model for the particular phoneme in the group of phonemes, as shown in block 912 of FIG. 9. A duration model is a model which determines how a duration score for a phoneme should be calculated. The duration score may then be used to adjust a phoneme or utterance recognition score with the goal of ultimately improving ASR recognition results. A number of different duration models may be used. In one aspect of the present disclosure, the duration model may be for example, a chi squared distribution or a Gaussian distribution of the duration ratios discussed above. For example, FIG. 11 shows a sample chi-squared distribution for the duration of the phoneme "E" when in the group "HEL", written as $$\left(\frac{D(E)}{D(HEL)}; \text{when } E \text{ is in } HEL\right),$$

where the parameters of the model were estimated over a number of instances of that particular phoneme/group combination in the training data. As shown, the most frequent ratio of the evaluated instances may be ⅓ with shorter ratios and longer ratios exhibiting fewer examples.

The histogram may be used to estimate the parameters of a chi-squared probability distribution, which may form the basis of the duration model for the phoneme/group combination. For example, the histogram of FIG. 10 may be used to create the probability distribution graph shown in FIG. 11. FIG. 11 shows the probability distribution for a particular instance of the phoneme "E" in the group "HEL", written as $$P\left(\frac{D(E)}{D(HEL)}; \text{when } E \text{ is in } HEL\right).$$

Figure 11:
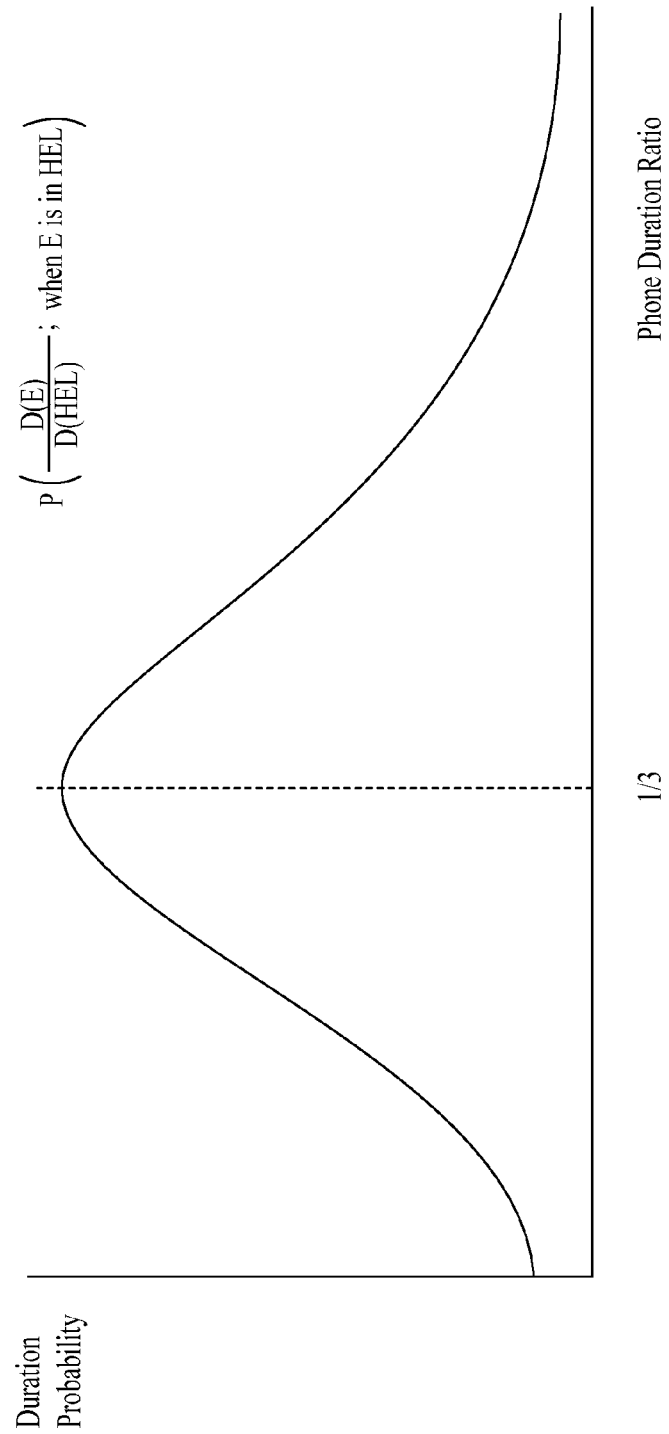
FIG. 11 illustrates a duration probability distribution according to one aspect of the present disclosure.

The probability distribution of FIG. 11 may be used to compute duration scores.

In certain aspects, a sum of multiple probability distributions may be used for particular phoneme/group combinations. For example in the case of a bi-modal distribution, where there are two peaks representing more than one likely duration for a phoneme within a group of phonemes, that distribution may be represented by a sum of two chi-squared distributions, each with its own parameters. Such multimodal distributions may be used when a particular phoneme/ group combination has different, but frequently occurring ratios, such as when a phoneme has a different duration in one word than in another.

In another aspect of the present disclosure the duration model may be constructed in a different manner. For example, instead of or in addition to using a probability distribution, other classifiers may be considered as part of the duration model. Such classifiers may be based on statistics other than the duration ratio described above, for example, an absolute duration of a phoneme, a duration ratio of neighboring phonemes and/or a duration of a phoneme relative to a different group of speech units, such as an utterance or a sentence. Classifiers may be used in combination with the duration ratios described above so that duration becomes one factor to be considered in a duration model rather than the exclusive factor. For example, following block 912 in FIG. 9, creation of a duration model may include incorporating additional information from classifiers to create the duration model. Classification models may be constructed using a support vector machine, neural networks, linear model, log linear model, generalized linear model, or other technique.

A duration model incorporating the classifiers may output an adjusted probability (or score) that a phoneme has an appropriate duration. In this manner additional context may be incorporated into construction and application of a duration model. Further, based on the quality of ASR results when using a duration model including such classifiers, the classifiers used may be adjusted to refine the duration model and improve ASR results.

Duration models may be calculated for many phoneme/ group combinations. The more models the ASR module 214 has available, the more accurate the duration modeling will be while processing audio data. In one aspect, each phoneme/group combination in the training corpus may be processed for inclusion in a duration model. Duration models may be calculated for various speech unit/group combinations such as phoneme/quinphone, phoneme/word, word/ sentence, etc. The speech recognition engine 218 may apply one or more duration models based on the input feature vectors, the desired processing approach or other considerations.

In one aspect, speech unit/group combinations that do not appear frequently in the speech storage 220, such as phoneme/group combinations that appear in rarely used words, may be clustered together for purposes of duration modeling. Each cluster may be comprised of rare combinations with some similarity (such as common phoneme(s), similar usage, etc.). A cluster may be associated with a duration model, which would be applied to each combination in the cluster should that combination appear in the audio data to be processed.

Once prepared, the available duration models may be included in the speech storage 220 for use in ASR processing. The duration models may also be edited or expanded when desired.

Figure 12:
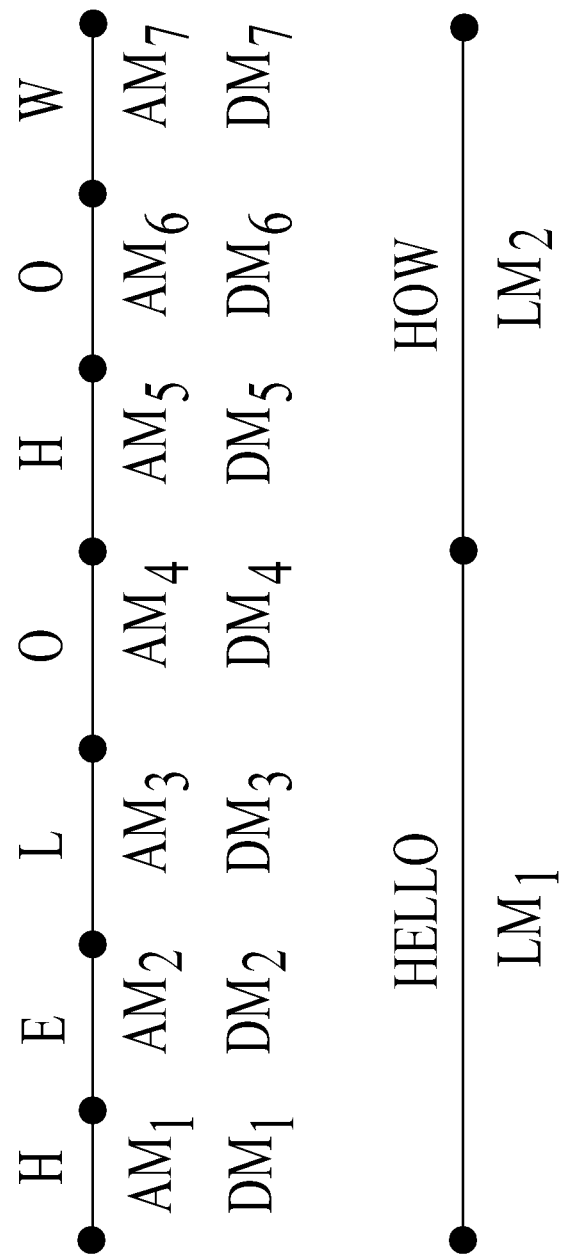
FIG. 12 illustrates application of a duration model according to one aspect of the present disclosure.

Duration modeling may be applied by the speech recognition engine 218 to adjust the recognition score assigned to a particular phoneme based on the calculated duration score. The duration score may be applied to adjust the overall recognition score of a particular phoneme. For example, as shown in FIG. 12, acoustic model scores AM1 through AM7 may be combined with duration model scores DM1 through DM7, respectively, prior to application of the language model scores LM1 and LM2. Duration scores may be calculated as described below. The determination of the duration model scores may be a post processing step that is done after a first pass of speech recognition, or the determination of the duration model scores may be performed in the same pass as the determination of the acoustic and language model scores.

Where the determination of duration model scores is performed as a post-processing step, the duration models may be computed from a lattice or an N-best list as shown above in FIG. 7 and FIG. 8. A lattice and an N-best list may each include acoustic model scores for each phoneme and language model scores for each word. For example, FIG. 12, without the duration scores, may represent a single path through a lattice or one entry in the N-best list, and the post-processing step may add the duration scores. For each phoneme in the lattice or N-best list, the duration model score may be computed as described above. For example, for the phone /E/ in FIG. 12, the duration model score may be computed by computing a ratio of the duration of /E/ to the duration of the group /H/, /E/ and /L/, selecting the appropriate duration model, and computing the duration model score using the ratio and the model. This process may be repeated for each phoneme in the lattice or N-best list. After the duration scores have been computed, the scores for each path through the lattice or each item in the N-best list may be recomputed as described above.

For example, for phoneme /E/, the speech recognition engine 218 may apply a duration model for /E/ as appearing in the group /H/, /E/ and /L/ to the phoneme being processed. Based on the duration of the phoneme being processed relative to its group, the speech recognition engine 218 may apply a duration model score to the acoustic model score. For example, if the duration score for /E/ in "HEL" is 0.67, the adjusted score for /E/ would be 0.2881 (AM of 0.43*DM of 0.67). In calculating the recognition scores for other potential results (such as other paths along a lattice or other entries on an N-best list), the speech recognition engine 218 may also apply further different duration modeling based on the phoneme /E/, such as the duration model for /E/ appearing in "YEL", the duration model for /E/ appearing in "WEL", etc. These duration weighted phonemes and paths may then be passed to the language model for processing.

The duration model scores may also be computed in the same pass as the acoustic model scores and the language model scores. In order to compute a duration model score for a phoneme, the length of the phoneme and the corresponding group should be known. Since the duration model score of a phoneme may depend on the duration of a subsequent phoneme, there may be a time lag between computing the acoustic model scores and the duration model scores. For example, returning to the phoneme /E/ in FIG. 12, the acoustic model score for /E/ and the duration of /E/ may be known soon after processing the feature vectors corresponding to /E/. To determine the duration model score for /E/, however, the duration of /L/ may be needed and thus the feature vectors corresponding to /L/ must be processed before a duration model score for /E/ may be determined. Although the duration model scores for a phoneme may be computed at a later time than the acoustic model scores, the incorporation of duration model scores into a conventional speech recognition pass is a straightforward application of the duration model score computation as described above.

Figure 13:
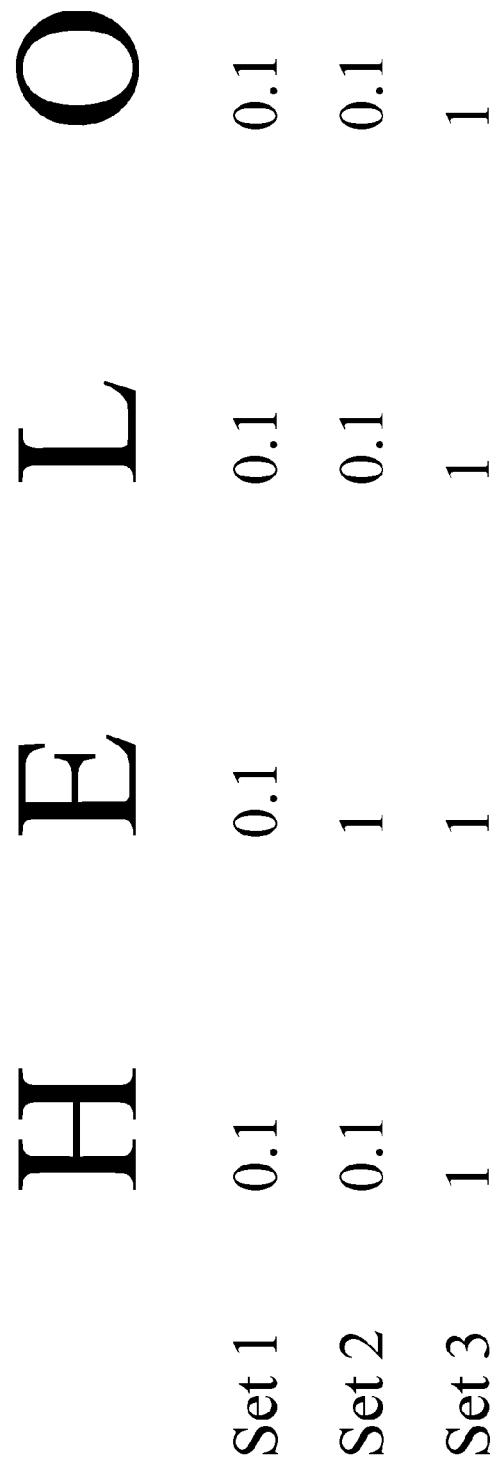
FIG. 13 illustrates phoneme durations according to one aspect of the present disclosure.

To illustrate the application of duration model scores, FIG. 13 shows three sets of phoneme durations for the phonemes "H" "E" "L" "O" of the word "hello." In Set 1, each phoneme has a duration of 0.1 second. In Set 2, the phoneme for "E" has a duration of 1 second, while all the other phonemes have a duration of 0.1 second. In Set 3, each phoneme has a duration of 1 second. If the relative duration of each of the phonemes is, on average, about the same, then the duration model score for /E/ in Set 1 and Set 3 would likely have a higher value (closer to 1) since the durations of /E/ and the surrounding phonemes are the same. In Set 2, however, the duration of /E/ is ten times the duration of the surrounding phonemes, and thus the duration model score for /E/ may have a lower value (closer to 0).

Duration model scores may be applied during various points in the ASR process or post-processing. As discussed, duration model scores may be applied during acoustic model processing or after acoustic model processing. Duration model scores may also be applied during or after language model processing. Further, duration model scores may be applied during lattice construction or after construction of a lattice. Similarly, duration model scores may be applied during construction of an N-best list or after construction of an N-best list.

If a word being processed is a single phoneme word (such as "a" or "I"), application of a duration model may yield undesirable results. Accordingly, in one aspect duration modeling may be skipped for a single phoneme word, with either no duration model being applied to these words or a context-independent duration modeling being applied to these words. In another aspect, single phoneme words may be considered in the context of neighboring words, and a duration model applied based on those neighboring words.

As the duration model depends in part on the duration of the group being considered, it may be desirable to perform certain processing on the individual phonemes of the group prior to application of the duration model. For example, if noise or silent phonemes are included in the group, application of a duration model to that group may not achieve an accurate result. It therefore may be desirable to remove noise and/or silent phonemes from a group prior to application of a duration model. For example, for a group of five phonemes including a noise phoneme, the duration of the group may be based on only the four non-noise phonemes. In some aspects, the group will not span a noise or silent phoneme. For example, for a group of five phonemes where the second phoneme is silence, the first and second phonemes may not be considered in determining a duration for the group.

Normalization may counter any biases created by comparing utterances with different numbers of speech units. Since the application of a duration model may add a penalty for each phoneme in an utterance, an utterance with a larger number of phonemes (as compared to another utterance in a lattice or N-best list) may be unduly penalized. To normalize an utterance, a normalized duration score may be calculated. The utterance normalization may be performed on different speech unit types, for example on phones or words. The normalization method applied may depend on the nature of the duration score, e.g., log-likelihoods or posterior probabilities. Possible normalization approaches include normalizing using an arithmetic mean (summing up N values and dividing by N) or using a geometric mean (multiplying N values and taking the Nth root), where N is the number of speech units in the utterance. In order to accommodate for the varying duration of the speech units, the impact of each instance may be weighted according to its absolute duration. Normalization then is performed with regard to the duration of the utterance. For example, given two phonemes $P_1$ and $P_2$, scores $S_1$ and $S_2$, and absolute durations $D_1$ and $D_2$, the un-weighted average is $$\frac{S_1 + S_2}{2}$$

and the weighted average is $$\frac{D_1 * S_1 + D_2 * S_2}{D_1 + D_2}.$$

Figure 14:
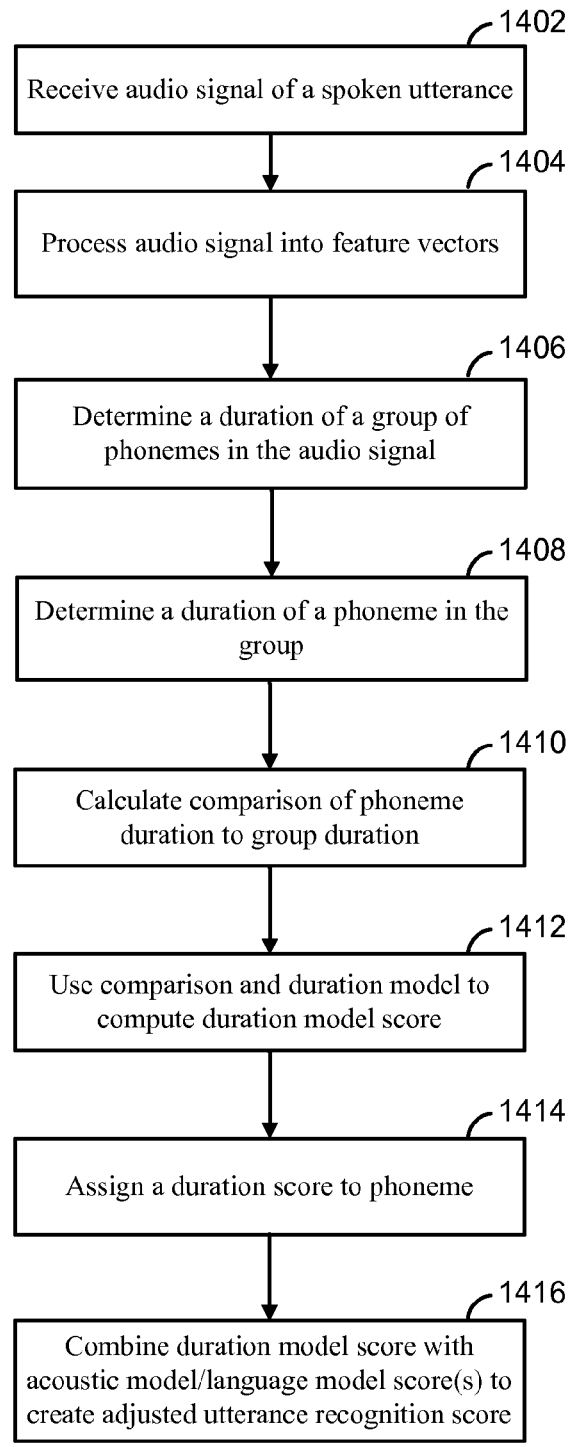
FIG. 14 illustrates duration modeling according to one aspect of the present disclosure.

Other normalization techniques may also be used. Normalization may be applied to remove from consideration certain undesired speech units (such as noise, silence, etc.) which may impact duration scores. Normalization may render scores comparable among utterances with different ratios of silence comparable In one aspect of the present disclosure, duration modeling is performed as illustrated in FIG. 14. An ASR device receives audio data of a spoken utterance, as shown in block 1402. The ASR device processes the audio data into feature vectors, as shown in block 1404. The ASR device determines a duration of a group of phonemes in the audio data, as shown in block 1406. The ASR device determines a duration of a phoneme in the group, as shown in block 1408. The ASR device calculates a comparison of the phoneme duration to the group duration, as shown in block 1410. In some aspects, the comparison may be a ratio. The ASR device uses the comparison and a duration model for the phoneme/group combination to compute a duration model score, as shown in block 1412. As discussed above, the duration model may consider the duration ratio of a phoneme as well as additional classifier data. The ASR device assigns a duration model score to the phoneme, as shown in block 1414. The ASR device combines the duration model score with an acoustic model score and/or a language model score to create an adjusted utterance score, as shown in block, 1416. The acoustic model score, language model score and duration model score may be used to compute an adjusted utterance recognition score.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the ASR techniques described herein may be applied to many different languages, based on the language information stored in the speech storage 220.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk and/or other media.

Aspects of the present disclosure may be performed in different forms of software, firmware and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A method of recognizing speech in audio data, the method comprising:
   receiving audio data representing speech, wherein the receiving is performed by an automated speech recognition (ASR) device configured to convert the audio data to text data, the ASR device comprising an ASR module;
   transforming, by the ASR module, the audio data into one or more feature vectors representing the speech;
   identifying, by the ASR module and using a portion of the one or more feature vectors, a sequence of phonemes represented in a portion of the audio data;
   determining, by the ASR module, a first duration of the sequence of phonemes;
   determining, by the ASR module, a second duration of a single phoneme within the sequence of phonemes;
   determining, by the ASR module, a duration score of the single phoneme, wherein the duration score is determined using the second duration in relation to the first duration;
   determining, by the ASR module, a recognition score based at least in part on the duration score;
   determining, by the ASR module, a speech recognition result based at least in part upon the recognition score, wherein the speech recognition result is the text data corresponding to the speech; and
   causing a command to be executed using the text data.

2. The method of claim 1, wherein the sequence of phonemes comprises at least two phonemes in the sequence prior to the single phoneme and at least two phonemes in the sequence subsequent to the single phoneme.

3. The method of claim 1, wherein determining the duration score comprises computing a ratio of the second duration to the first duration.

4. A method, comprising:
   receiving audio data, wherein the receiving is performed by at least one automated speech recognition (ASR) device configured to convert the audio data into text data, the at least one ASR device comprising at least one ASR module;
   determining, by the at least one ASR module, a sequence of speech units represented in a portion of the audio data;
   determining, by the at least one ASR module, a first duration of the sequence of speech units;
   determining, by the at least one ASR module and using the first duration, an expected duration of a single speech unit in the sequence of speech units;
   determining, by the at least one ASR module, a second duration of the single speech unit;
   determining, by the at least one ASR module, a duration score of the single speech unit, the duration score corresponding to the second duration in relation to the expected duration;
   determining, by the at least one ASR module, a speech recognition result based at least in part on the duration score of the single speech unit, wherein the speech recognition result is the text data corresponding to the received audio data representing speech; and
   causing a command to be executed using the text data.

5. The method of claim 4, wherein determining the duration score comprises calculating the duration score using at least one of a chi-squared model or a mixture model.

6. The method of claim 4, wherein the duration score is further based at least part on at least one of an absolute duration of the single speech unit, a duration ratio of a neighboring speech unit, or the second duration compared to a third duration of an utterance.

7. The method of claim 4, wherein the single speech unit is one of a phoneme, a triphone, or a quinphone.

8. The method of claim 4, wherein determining the first duration comprises excluding at least one speech unit in the sequence of speech units when determining the first duration.

9. The method of claim 4, wherein the duration score is based at least in part on a ratio of the second duration to the first duration.

10. The method of claim 4, further comprising normalizing the duration score using a number of speech units in an utterance comprising the single speech unit.

11. The method of claim 10, further comprising:
determining a respective duration score for each speech unit in an utterance including the single speech unit; and
wherein the normalizing the duration score comprises multiplying the determined respective duration scores of each speech unit in the utterance together and taking an Nth root of a result of the multiplying, where N is a number of speech units in the utterance.

12. A computing device configured to convert audio data to text data, comprising:
an audio capture device configured to receive audio data, the received audio data representing spoken utterances;
an automatic speech recognition (ASR) module configured to transform the received audio data into a sequence of speech units represented in the audio data;
at least one processor;
a memory device including instructions operable to be executed by the at least one processor to perform a set of actions, configuring the at least one processor:
to determine a first duration of the sequence of speech units of the received audio data;
to determine, using the first duration, an expected duration of a single speech unit of the received audio data in the sequence of speech units;
to determine, by the ASR module, a second duration of the single speech unit;
to determine a duration score of the single speech unit, the duration score corresponding to the second duration in relation to the expected duration;
to determine a speech recognition result based at least in part on the duration score of the single speech unit, wherein the speech recognition result is the text data corresponding to the received audio data representing speech; and
to cause a command to be executed using the text data.

13. The computing device of claim 12, wherein the at least one processor is further configured to compute the duration score using at least one of a chi-squared model or a mixture model.

14. The computing device of claim 12, wherein the duration score is further based at least part on at least one of an absolute duration of the single speech unit, a duration ratio of a neighboring speech unit, or the second duration compared to a third duration of an utterance.

15. The computing device of claim 12, wherein the single speech unit is one of a phoneme, a triphone, or a quinphone.

16. The computing device of claim 12, wherein the at least one processor is further configured to exclude at least one speech unit in the sequence of speech units when determining the first duration.

17. The computing device of claim 12, wherein the duration score is based at least in part on a ratio of the second duration to the first duration.

18. The computing device of claim 12, wherein the at least one processor is further configured to normalize the duration score using a number of speech units in an utterance comprising the single speech unit.

19. The computing device of claim 18, wherein the at least one processor is further configured to determine a respective duration score for each speech unit in an utterance including the first speech unit; and
wherein the at least one processor configured to normalize the duration score comprises the at least one processor configured to multiply the determined respective duration scores of each speech unit in the utterance together and taking an Nth root of a result of the multiplying, where N is a number of speech units in the utterance.

20. A non-transitory computer-readable storage medium storing processor-executable instructions for controlling a computing device, comprising:
program code to cause an automated speech recognition (ASR) module, configured to convert audio data to text data, of the computing device to transform the audio data received by the computing device into a sequence of speech units represented in the audio data;
program code to determine a first duration of the sequence of speech units of the received audio data;
program code to determine, using the first duration, an expected duration of a single speech unit of the received audio data in the sequence of speech units;
program code to determine, by the ASR module, a second duration of the single speech unit;
program code to determine a duration score of the single speech unit, the duration score corresponding to the second duration in relation to the expected duration; and
program code to determine a speech recognition result based at least in part on the duration score of the single speech unit, wherein the speech recognition result is the text data corresponding to the received audio data representing speech; and
program code to cause a command to be executed using the text data.

21. The non-transitory computer-readable storage medium of claim 20, wherein the program code to determine the duration score comprises program code to compute the duration score using at least one of a chi-squared model or a mixture model.

22. The non-transitory computer-readable storage medium of claim 20, wherein the duration score is further based at least part on at least one of an absolute duration of the single speech unit, a duration ratio of a neighboring speech unit, or the second duration compared to a third duration of an utterance.

23. The non-transitory computer-readable storage medium of claim 20 wherein the single speech unit is one of a phoneme, a triphone, or a quinphone.

24. The non-transitory computer-readable storage medium of claim 20, in which the program code to determine the first duration comprises program code to exclude at least one speech unit in the sequence of speech units when determining the first duration.

25. The non-transitory computer-readable storage medium of claim 20, wherein the duration score is based at least in part on a ratio of the second duration to the first duration.

26. The non-transitory computer-readable storage medium of claim 20, further comprising program code to normalize the duration score using a number of speech units in an utterance comprising the single speech unit.

27. The non-transitory computer-readable storage medium of claim 26, further comprising:
- program code to determine a respective duration score for each speech unit in an utterance including the first speech unit; and
- wherein the program code to normalize the duration score comprises program code to multiply the determined respective duration scores of each speech unit in the utterance together and take an Nth root of a result of the multiplying, where N is a number of speech units in the utterance.

\* \* \* \* \*